Aug. 5, 1924.

E. D. JONES, JR 1,503,901

LIVE BAIT SPINNER

Filed May 19, 1923

Edward D. Jones, Jr.
Inventor

Witnesses:

Patented Aug. 5, 1924.

1,503,901

UNITED STATES PATENT OFFICE

EDWARD D. JONES, JR., OF ROCHESTER, NEW YORK.

LIVE-BAIT SPINNER.

Application filed May 19, 1923. Serial No. 640,071.

*To all whom it may concern:*

Be it known that I, EDWARD D. JONES, Jr., a citizen of the United States, residing at Rochester, in the county of Monroe and State of New York, have invented certain new and useful Improvements in Live-Bait Spinners, of which the following is a specification.

In carrying out the present invention it is my purpose to provide an article of fishing tackle wherein the same is adapted to hold a live bait such as minnow or the like, whereby when the same is moved through the water the fish will be attracted thereto.

The primary object of the invention is to provide a spinner for live bait that is extremely simple of construction and one that may be manufactured and marketed at relatively small cost.

The nature and advantages of the invention will be better understood when the following detailed description is read in connection with the accompanying drawing, the invention residing in the construction, combination and arrangement of parts as claimed.

In the drawing, forming part of this application, like numerals of reference indicate similar parts in the several views, and wherein:—

Figure 1:
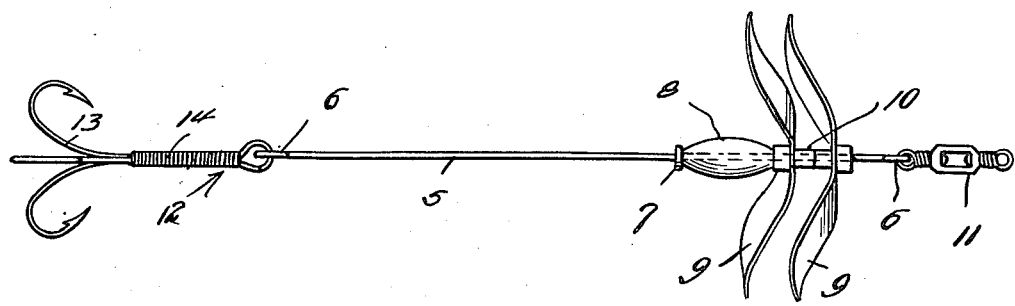
Figure 1 is a side elevation.
Figure 2:
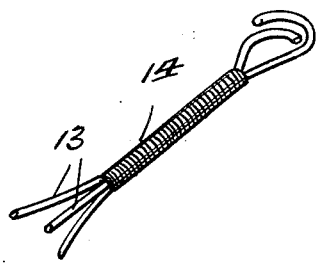
Figure 2 is an enlarged fragmentary perspective of the detachable hook element.

Having particular reference to the drawing, 5 designates a relatively elongated rod that has its opposite ends reversely bent to provide eyes 6. The said rod 5 is formed adjacent its front end with an abutment 7 and slidable on the rod between the abutment and the front end thereof is a high polished bead 8 that is employed for obvious purposes. Between this bead and the eye 6 upon the end of the rod are a pair of slidable and rotatable spinners 9 that are separated from each other through the medium of a collar 10, the blades forming these spinners being pitched in opposite directions for thereby causing the rotation of different spinners in opposite directions during the movement of the same through the water.

The front end of the rod 5 carries a desirable form of swivel 11 and in use, the opposite end of the rod 5 is extended through the mouth of a minnow or other live bait and then forced outwardly through its body at a point adjacent the tail thereof. After this end of the rod has been projected through the body a hook designated 12 is engaged with the eye 6 at this end of the rod. This hook 12 constitutes three hook elements 13 the shanks of which are secured together by wrapping or coiling a length of wire 14 therearound. The ends of two of the hook shanks are hooked inwardly in opposite directions for providing a snap eye at the end of the hook 12 whereby the same may be readily attached or detached to or from the eyed end 6 of the rod 5.

From the foregoing description, taken in connection with the accompanying drawing, the advantages of construction and the mode of operation of the invention will be readily apparent to those skilled in the art, and while I have described the principles of operation of the invention, together with the device which I now consider to be the best embodiment thereof, I desire to have it understood that the device shown is merely illustrative, and that such changes may be made when desired without departing from the spirit and scope of the appended claim.

Having described my invention, what I claim and desire to secure by Letters-Patent, is:—

A live bait spinner including a main rod provided with eyes at each end, a swivel secured to one eye for connecting said rod to a line, an abutment mounted on the rod near the end receiving the swivel, an elongated head having a central opening receiving the rod between the swivel connection and the abutment, a pair of oppositely rotated spinners mounted on the rod between the head and the end mounting said swivel, the portion of the rod on the other side of the abutment forming a live bait receiving portion, and a hook assembly provided for removable connection with the eye at the end of the bait receiving portion.

In testimony whereof I affix my signature.

EDWARD D. JONES, JR.